United States Patent [19]

Tschepke et al.

[11] Patent Number: 4,907,394
[45] Date of Patent: Mar. 13, 1990

[54] METHOD FOR PRODUCING A FOIL-CONTAINER, APPARATUS FOR THE IMPLEMENTATION OF THE SAID METHOD, AND A FOIL-CONTAINER PRODUCED ACCORDING TO THE SAID METHOD

[75] Inventors: Josef Tschepke, Obertshausen; Bernhard Oerther, Maintal; Eduard Hintermaier, Obertshausen, all of Fed. Rep. of Germany

[73] Assignee: Unionpack Industrielle Lohnverpackuns-GmbH & Co., Frankfurt am Main, Fed. Rep. of Germany

[21] Appl. No.: 199,938

[22] Filed: May 27, 1988

[51] Int. Cl.⁴ ............ B65B 47/10; B65B 43/10; B29C 51/08; B29C 51/30
[52] U.S. Cl. ............... 53/412; 53/453; 53/455; 53/133; 53/559; 53/562
[58] Field of Search ............ 53/412, 453, 454, 455, 53/559, 560, 562, 133; 264/527, 570, 571

[56] References Cited

U.S. PATENT DOCUMENTS

| | | | |
|---|---|---|---|
| 2,918,168 | 12/1959 | Sanni | 53/453 X |
| 3,039,246 | 6/1962 | David | 53/453 |
| 3,184,895 | 5/1965 | O'Connor | 53/453 X |
| 3,199,551 | 8/1965 | Hall et al. | 53/562 X |
| 3,245,197 | 4/1966 | Van Mil, Jr. et al. | 53/453 |
| 3,782,066 | 1/1974 | Schmitt | 53/453 X |
| 4,470,240 | 9/1984 | Torterotot et al. | 53/455 |
| 4,588,090 | 5/1986 | Spuck et al. | 53/559 X |
| 4,642,972 | 2/1987 | Guiffray | 53/453 |
| 4,704,844 | 11/1987 | Mancini | 53/453 |

FOREIGN PATENT DOCUMENTS 1055802 4/1959 Fed. Rep. of Germany.
3141069 5/1983 Fed. Rep. of Germany.
3643030 6/1988 Fed. Rep. of Germany.

Primary Examiner—Horace M. Culver
Attorney, Agent, or Firm—Felfe & Lynch

[57] ABSTRACT

For the purpose of producing filled foil-containers adapted to stand upon their bases, container-parts having tubular parts are initially deep-drawn, in a strip of foil, on each side of centerline running in the direction of travel, the said tubular parts running towards the edges of the foil but terminating at a distance therefrom. Thereafter, the foil-parts lying on each side of the centerline are heated and are folded up about the said centerline, which thereby becomes a fold-line to form open containers which are then sealed, at a first sealing station around their peripheries, except for the perpheries of the upwardly projecting tubular parts. The edges of the foil are then spread apart in the vicinity of the said tubular parts, through which the containers are filled. The spreading is released and the containers are sealed, in a second sealing station in such a manner as to close the peripheries of the said tubular parts also. Opening-aids are then made in the vicinity of the tubular parts thus formed and the filled containers are separated individually or into groups. An apparatus of this kind consists of a supply-station with a roll of foil, a conveyor, a deep-drawing station, a heating station, a first and second sealing station and a first and second stamping station.

19 Claims, 7 Drawing Sheets

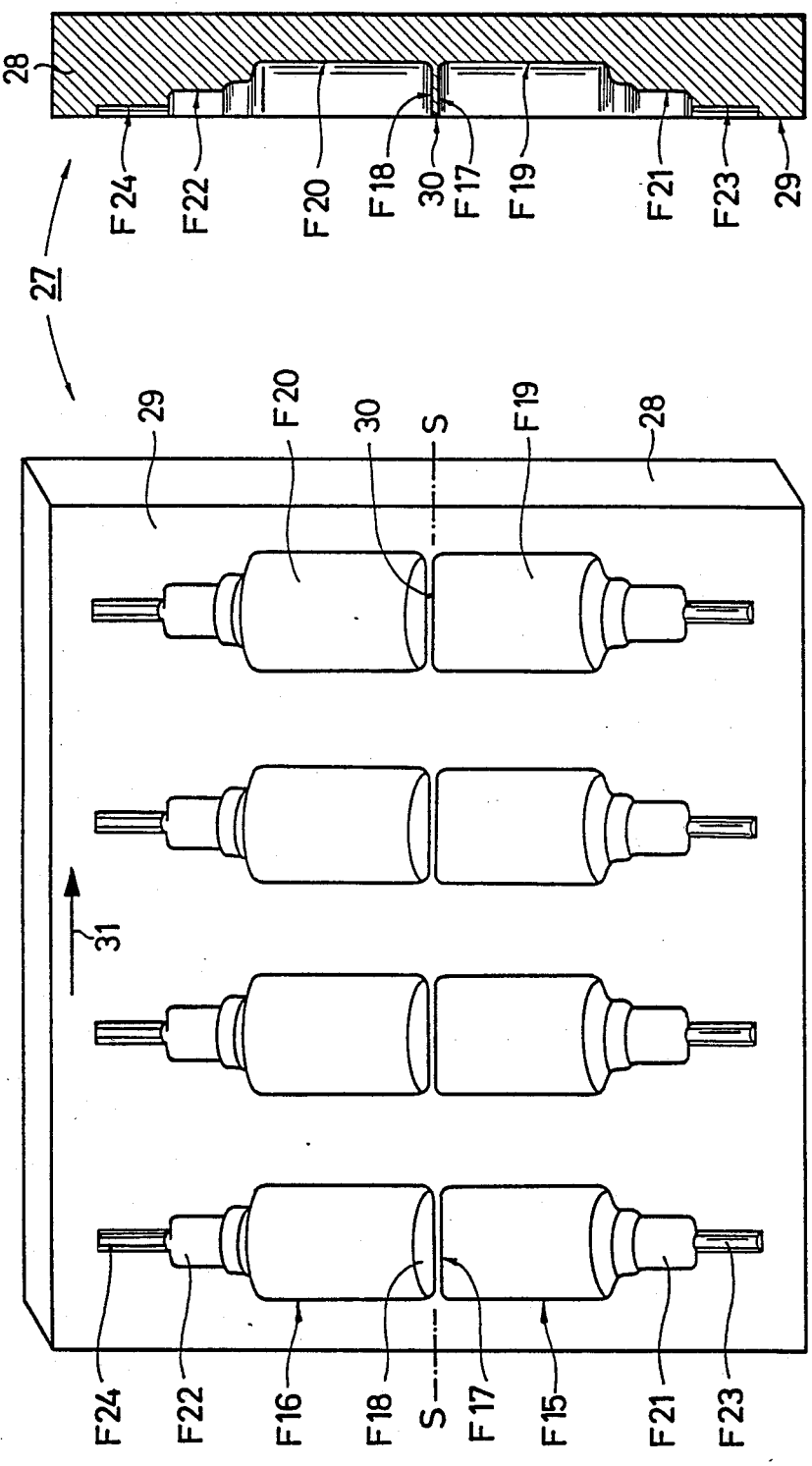

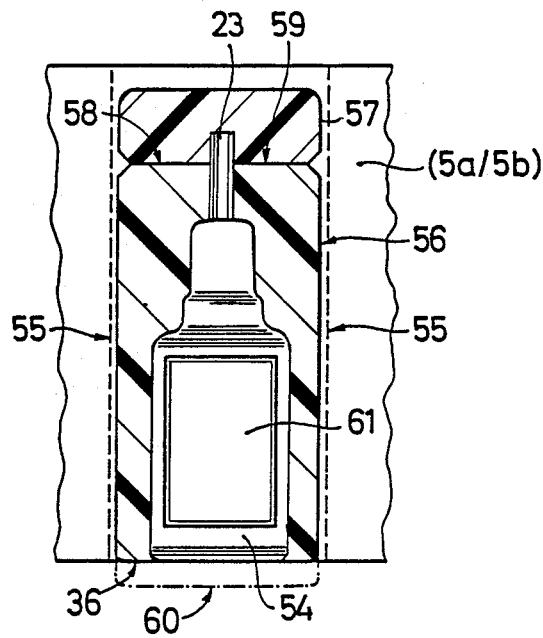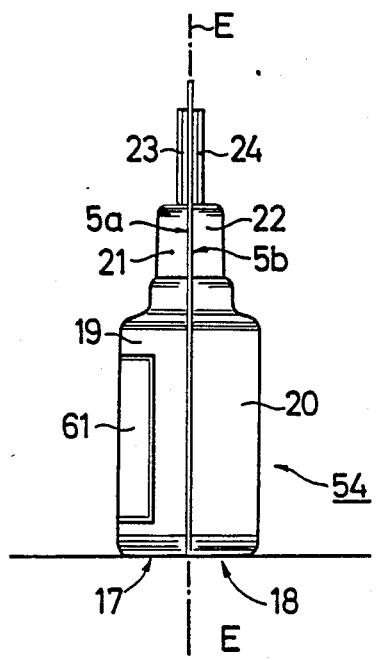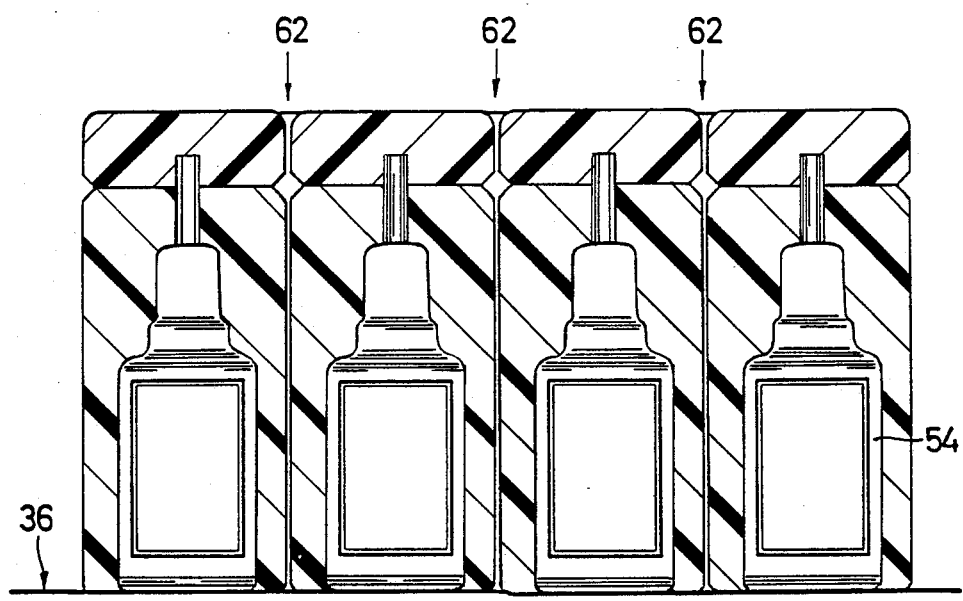
FIG. 8  FIG. 9
FIG. 10

METHOD FOR PRODUCING A FOIL-CONTAINER, APPARATUS FOR THE IMPLEMENTATION OF THE SAID METHOD, AND A FOIL-CONTAINER PRODUCED ACCORDING TO THE SAID METHOD

The invention relates to a method for producing foil-containers in the form of bottles filled with freely flowing substances, and having bases upon which they are adapted to stand, by:

(a) deep-drawing at least a part of each foil-container from a piece of flat deformable foil having a base-part running substantially at right angles to the plane of the foil, with a neck-section remote from the base-part, and with edge-areas projecting outside the base at the periphery of the container-part;

(b) by folding the foil-material about a line located substantially at the edge-like transition between the base-part and the plane of the foil;

(c) by connecting the pieces of foil lying on each side of the fold-line and one upon the other in the edge-areas after having been folded around, from the bases to at least approximately the upper ends of the half-sections, by means of a first connecting process;

(d) by filling each container through the half-section;

(e) by closing each container.

A method of this kind, and a foil-container produced thereby, are known from German AS No. 10 55 802. With the known method it is, however, initially possible only to use a sequence of steps to produce an empty foil-container, the peripheral flange of which is sealed all around. In order to fill the known container, the neck of the bottle must be cut off and, after it has been filled, a closure must be fitted to, or inserted into, the neck. However, not only does this mean that a liquid-tight closure can be obtained only at considerable expense and by using additional parts but, if the sealing edge is cut off just above the end of the neck, this produces only a narrow gap, through which it is almost impossible to fill the container. Because of the sealing edges at the side of the neck, it is also impossible to fit a sealed closure thereto. It is also difficult to cut off the closing wall of the neck because it is impossible to provide any abutment in the neck of the bottle for the cutting operation. Any damage to the top end of the neck also makes it impossible to fit a sealed closure and there exist, in the vicinity of the seals, at diametrically opposite locations on the neck, so-called capillary gaps which cannot be closed with an insert, or at least not without additional sealing means. None of these measures can be used in conjunction with a continuous or quasi-continuous process.

In the prior art also mentioned in German AS No. 10 55 802, namely in the case of foil-containers consisting of two halves with a peripheral seal, it is also known to form, on the neck of the bottle, a tubular part having an aid to opening and to carry out the filling of the container in the inverted position through the base. To this end a filling duct is formed, during the deep-drawing process, on each of the two base-parts and extending to the edge of the respective piece of foil. Containers are formed progressively by congruent and mirror-image placing of two pieces of foil one upon the other, the filling duct running from the base being approximately cylindrical and being open towards the top. By means of a first sealing process, sealed edge-areas are produced between the said filling ducts. After this process of filling through the base, the filling ducts are closed by a second sealing process whereby the semicylindrically deformed material in each half of the filling duct is returned to the extended position, i.e. must be upset (?) onto the periphery. Because of the initially uneven surfaces, the necessary heating process is difficult to control. Apart from this, however, the sealing seam under the base of the bottle, occurring with this known process, makes it impossible for the bottle to stand upon its base. Such a container is already described in German AS No. 10 55 802 as disadvantageous.

It is therefore the purpose of the invention to provide a method of the type described at the beginning hereof, whereby a filled and reliably closed upstanding foil-container can be produced and will require no additional closure-parts.

According to the invention, this purpose is accomplished in that:

(f) during the deep-drawing process, there is formed, on each neck-section, a tubular part directed away from the base which is directed to the nearest foil-edge and ends at a distance "A" therefrom, and which subsequently ensures a sealed connection between the foil-parts lying upon the other end of the tubular part and initially not connected;

(g) the foil-parts lying one upon the other are joined together in the edge-area, with the exception of a filler opening, at the tubular ends;

(h) each foil-container is filled through the tubular part;

(i) the foil-parts lying one upon the other at the tubular end in the vicinity of the filler opening are sealed together by a second connecting process and, finally, (j) the filled and sealed foil-containers are separated individually or into groups.

In this connection it is essential that the tubular part shall not extend to the respective foil-edge but shall terminate at a distance "A" therefrom, a distance that may amount to between 5 and 20 mm. This ensures that there will be flat foil-parts above the end of the tubular part which can be joined together, after filling, by a second connecting process, with no need for the tubular part to be squeezed and for the material to be upset. The hot sealing of foil-parts lying flat one upon the other raises less problems in a continuous manufacturing process than reforming open filing ducts as far as the edge, especially since the said ducts are larger in diameter.

With the method according to the invention it is possible to fill and close securely a foil-container adapted to stand upon its base, in an uninterrupted sequence of steps and from a single piece of foil, with no need for separate and additional closure-parts or means for connecting these parts to the container.

This is a particularly advantageous way of packaging so-called test-samples which are very often mass-produced in large numbers and are distributed for publicity purposes. A special effort is made in this connection to make the miniatures as alike as possible to the original package, so that they are associated in the mind of the public. Above all, it must be possible to produce these miniatures in the largest possible numbers at the lowest possible costs.

The term "deepdrawing" is intended to mean any method for producing permanent deformation of a single- or multi-layer foil whereby a depression is produced in the flat foil which can subsequently be filled with a freely flowing medium (liquid, paste, powder). The deep-drawing process may be used with or without heat. Other foils, for example those consisting of an aluminum-laminate may be cold-shaped accordingly.

Suitable foils are so-called monofoils. Laminated foils are particularly advantageous. The overall thickness of the foil may start at about 0.1 mm, most of the wall-thickness serving to provided mechanical strength. This part of the laminate is preferably made of polyvinyl-chloride, polystyrene, aluminum-foil, polypropylene and polyester. For vapour- and gas-barriers it is preferable to use a laminate consisting of aluminum-foil, polyvinyl-dichloride, polyacrylonitrile, polyethtylene, polypropylene, polyester or polyamide. This list of materials, however, is given merely by way of example and is no way restrictive. A vapor-and gas-barrier also serves as an aroma-barrier, a property which is important in the case of perfumes.

The so-called "neck-section" need not differ in cross-section from the main part of the container. In this case, the upper part of the container is regarded as the neck-section. In order to promote similarity with a "real bottle", it is preferable for the neck section to be visibly smaller than the remainder of the container.

In this connection it is possible, with considerable advantage, to join together the flat foil-parts lying one upon the other only from the base to about the upper end of the neck-section, leaving the flat foil-parts above the neck section unconnected; then to spread the foil-parts in the vicinity of the tubular end and to fill the container through this spread. The spread is then released and the foil-parts are finally sealed together, by the second connecting process, from above the tubular end at least as far as the connected area of the first connecting process.

In a quite particularly advantageous manner, however, the method may be carried out continuously with the sequence of steps set forth in claim 3. A continuous method is also to be understood as one in which either the foil moves stepwise in relation to stationary work-stations or the said work-stations move, together with the foil, over a limited step-length, i.e. it is all a matter of relative motion. The deep-drawing process, sealing processes, filling processes and stamping processes are all carried out during the pauses. With certain tool-designs, however, it is also possible to keep the foil and the tools moving together continuously, for example if the tools are designed in the form of drums. However, a stepwise process may also be called "quasi-continuous". It is desirable for several, for example four, foil containers to be deep-drawn, hot-sealed, filled and stamped out simultaneously. Such a continuously processed length of foil is also known as a "repeat-length".

The heat-treatment station is of particular significance to the process. As will described in greater detail hereinafter, with the details of the apparatus, while the foil is being folded from the flat position to a vertical position, the two edges of the foil travel over a longer distance than the middle thereof. The foil-parts lying on each side of the centerline "M" are twisted at this time to a certain extent, an operation which causes stresses in the relatively stiff foil. By heating the foil to a material-specific temperature definitely below the deep-drawing plasticizing temperature, it is possible to make the foil so supple that it willingly follows the folding operation. This is particularly important in connection with the fold-line located in the middle of the foil, since the foil in this very small area has to be bent through 180°.

It is therefore particularly desirable for the foil in the heating station to pass under a heater-element which heats the middle of the foil from above, and for the foil also to be passed over a hot-edge which contacts the foil from below in the vicinity of the fold-line. The said heater-element and hot-edge are preferably heated to material-specific temperatures which, depending upon the type of foil used, may vary between 80° and 140° C.

The invention also relates to an apparatus for producing deep-drawn foil containers having bases upon which they are adapted to stand.

In order to accomplish this purpose, an apparatus of this kind is characterized according to the invention in that, in a deep-drawing tool having a flat surfaces serving to support the foil, at least one mold-cavity per container is arranged, the said cavity comprising mold-surfaces merging with each other in order to produce a base-part running at right angles to the tool-surface, a container-wall, a neck-section and a tubular part extending therefrom, the axis of which runs in the tool-surface determining the edge-area of the foil-surface.

An apparatus for continuous production and filling of deep-drawn containers with a deep-drawing tool of this kind is characterized in a particularly advantageous manner by the features set forth in claim 7.

An example of embodiment of the object according to the invention is explained hereinafter in greater detail in conjunction with the drawings attached hereto, wherein:

FIG. 3 is a plan view of a deep-drawing tool accommodated in a deep-drawing station;

FIG. 4 is a cross-section through the deep-drawing tool according to FIG. 3 in the vicinity of the longitudinal axis of two container-halves;

FIG. 8 is a front elevational view of a stamped-out foil container;

FIG. 9 is a side elevational view of the foil-container according to FIG. 8; and FIG. 10 is a front elevational view of four connected foil-containers according to FIG. 8.

Figure 1:
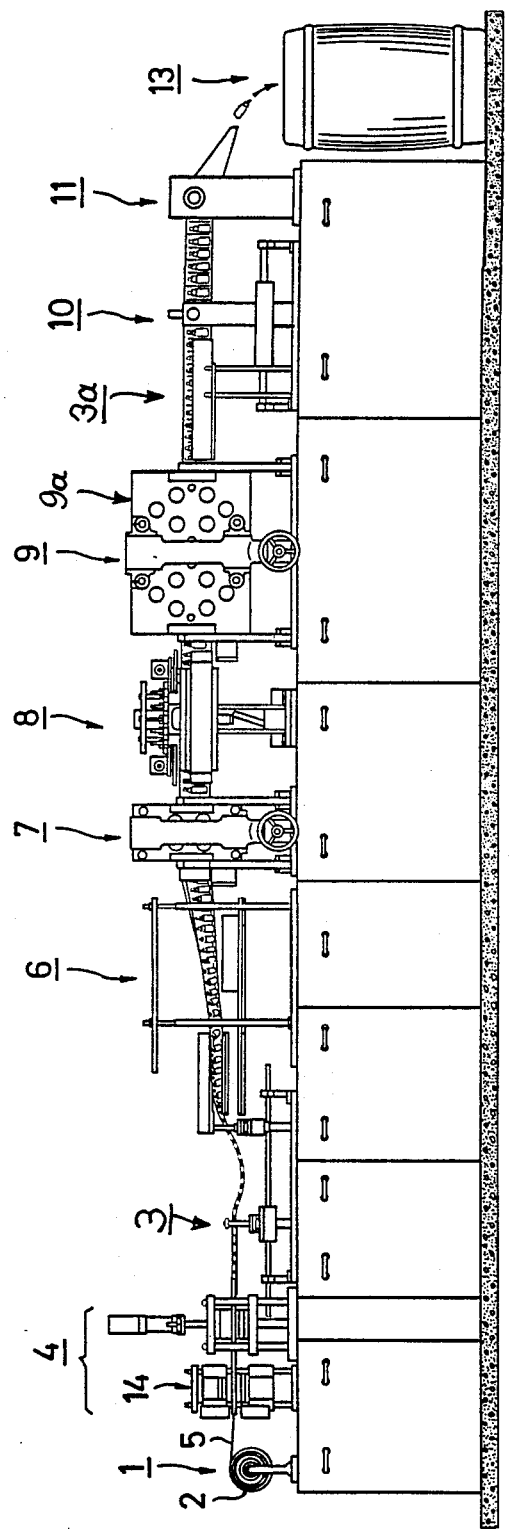
FIG. 1 is an overall view of an apparatus for the continuous production of foil-containers.

According to FIG. 1, the apparatus comprises a supply-station 1 having a roll 2 of foil, two conveyors 3,3a in the form of "stepping mechanisms" with reciprocating grippers, not shown, for stepwise feeding the foil 5 taken from the roll, a deep-drawing station 4 preceded by a heating device 14, a heating station 6 for the purpose of folding up the foil-parts on each side of a centre-line, a first sealing station 7, a filling station 8, a second sealing station 9 to which there also pertains a cooling station 9a, a first stamping station 10 used to produce weakening zones (embossings, stamping in linear or split form) for the purpose of forming an opening aid, and a second stamping station 11 which is used to separate the foil-containers from the laminate still connected together. The essential stations are described hereinafter in greater detail in conjunction with FIGS. 2 to 7.

The final stamping station is followed by a collecting bin.

Figure 2:
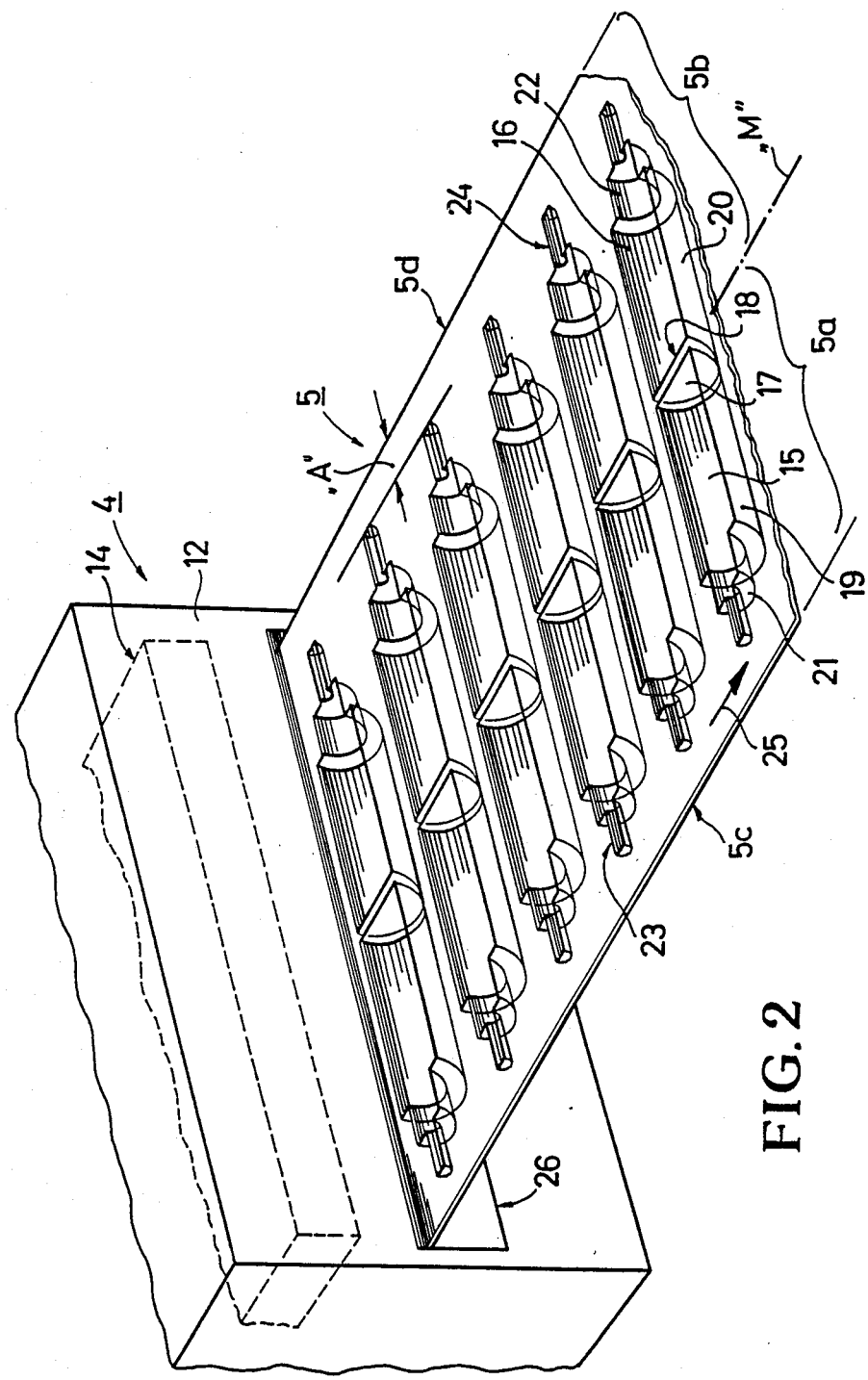
FIG. 2 is a perspective view of a deep-drawing station showing a foil with deep-drawn container-parts emerging therefrom.

Located in the deep-drawing station shown in FIG. 2, in a heat-insulated housing 12, is a deep-drawing tool 27 which will be explained in greater detail in conjunction with FIGS. 3 and 4. Associated with this tool is a heating device 14, shown only in broken lines, which is used to plasticize foil 5 prior to deep-drawing. The details of the deep-drawing process are state of the art and need not therefore be gone into here in greater detail.

Foil-parts 5a and 5b of equal width are formed in foil 5 on each side of an imaginary centreline "M" which coincides with the subsequent fold-line. These areas are defined outwardly by edges 5c and 5d running parallel with centreline "M".

Container-parts 15 and 16 are formed in foil 5, each in so-called "blocks of four" arranged in pairs and in mirror-symmetry with each other, each consisting of a base-part 17,18, a container-wall 19,20, a neck-section 21,22, and a tubular part 23,24. Base-parts 17,18 are arranged at the smallest possible distance apart, and parallel with each other on each side of centreline "M" which runs in parallel with the direction of travel indicated by arrow 25. Tubular parts 23,24 do not reach edges 5c, and 5d but terminate at a distance "A" in front of them. It will be seen that the longitudinal axes of the container-parts, and especially of the tubular parts, run at right angles to the edges of the foils and to the direction of travel, and that the parts within the foil pertaining to one container are at the same distance from each other, as determined by the configuration of the deep-drawing tool on the one hand and by the step-length predetermined by the conveyor, on the other hand. Foil 5 leaves housing 12 through an opening 26.

FIGS. 3 and 4 show details of deep-drawing tool 27. Arranged in a steel plate 28, running from a flat tool-surface 29 which is also the supporting surface for foil 5, are two mold-cavities F15, 5 F15 mold-cavities per container exhibiting mold-surfaces merging into each other. Mold-surfaces F17 and F18 are substantially at right angles to tool-surface 29 and serve to produce base-parts 17 and 18. Located therebetween is a thin-walled web 30, the upper edge of which is rounded off. Mold-surfaces F19 and F20 are substantially cylindrical and serve to produce container-walls 19 and 20. Mold-surfaces F21 and F22 are also cylindrical and serve to produce neck-sections 21 and 22. Mold-surfaces F23 and F24 are again cylindrical and serve to produce tubular parts 23 and 24. Located between individual mold-surfaces, for the purpose of bridging differences in diameter, are other mold-surfaces not defined herein which may be regarded as roughly semicircular. It will be seen that the axes of mold-cavities 15 and 16 are located in the surface of the tool and run at right angles to the direction of travel of foil 5, also indicated here with an arrow 31. The width of the foil is substantially equal to that of tool-surface 29, as seen at right angles to the direction of travel. This ensures that distance "A" is maintained (FIG. 2). When the foil is placed upon tool-surface 29, centreline "M" coincides with axis of symmetry S-S thereof.

Figure 5:
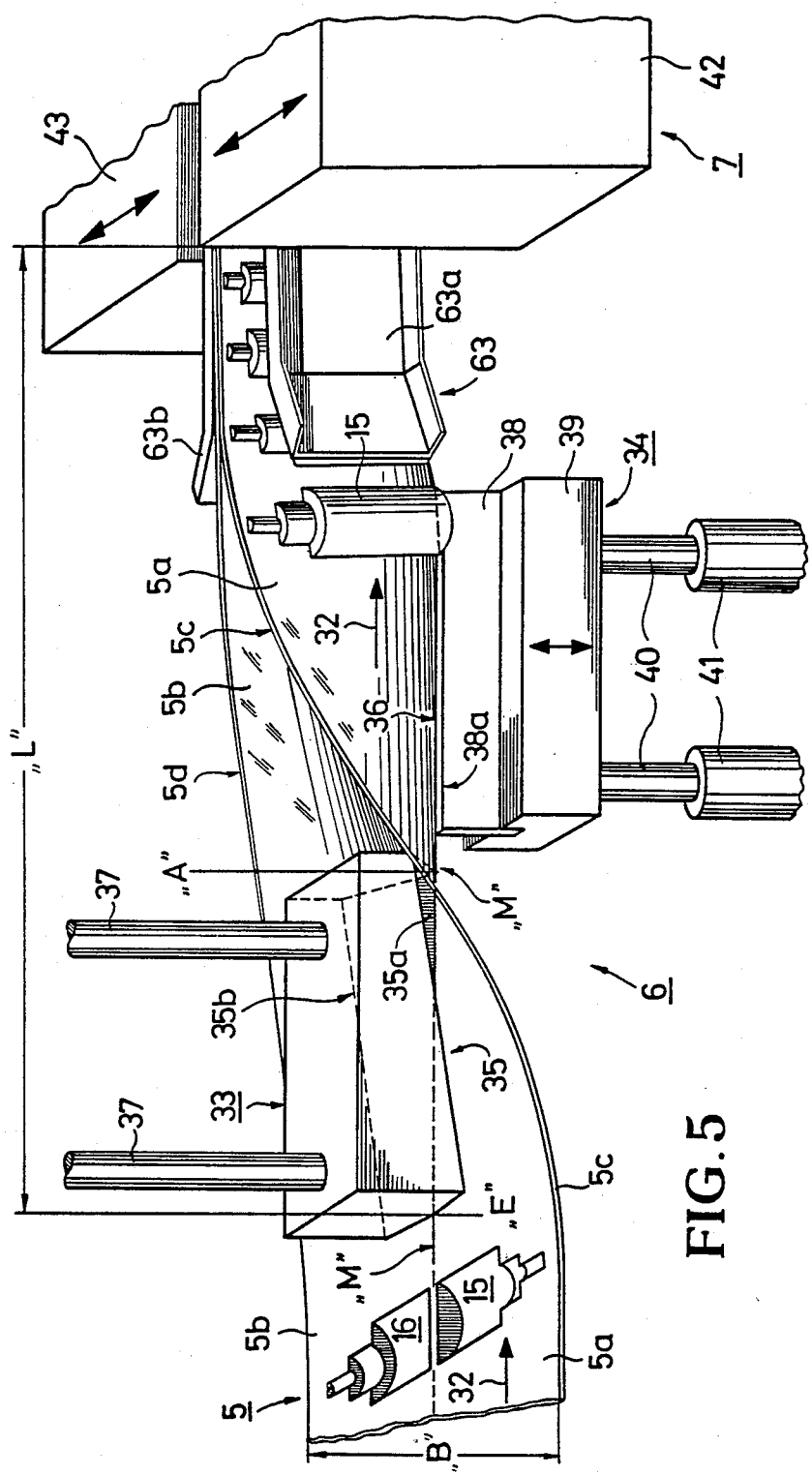
FIG. 5 is a perspective representation of the proceedings in the heating station as far as the entry into the first sealing station.

FIG. 5 shows details of heating station 6, although path "L", followed by the foil in the direction of travel is shown somewhat abbreviated for the sake of clarity. The foil-sections in FIGS. 2 and 5 must be regarded as directly connected together. Located in the central area of the foil are two heating devices 33 and 34 by means of which foil-parts 5a and 5b, located on each side of centreline "M" are heated. Starting from the horizontally extended position (at the left of FIG. 5), they are gradually folded up, about centerline "M", until they contact each other in a vertical plane (at the right of FIG. 5). For the sake of clarity only a few of container-parts 15 and 16 are shown.

It will be seen that edges 5c and 5d travel over a longer distance than centerline "M". This is attributable to twisting of foil-parts 5a and 5b—also shown graphically. Heating devices 33,34 are provided in order to overcome the bulkiness of the foil.

First heating device 33 along the path of the foil is in the form of a heater-element arranged above foil 5. Lower side 35 of the said element, facing the foil, is defined by surfaces 35a and 35b which are in mirror-symmetry and are arranged in a V in relation to each other. It will be seen that the angle of the V decreases continuously from inlet-side "E" to outlet-side "A" in accordance with the fold-angle between the foil-parts, and that the crest-line of surfaces 35a and 35b runs directly above the fold-line of the foil-parts. The underside of the heater-element is at all points at the shortest possible distance from the foil moving past. It will be seen from FIG. 6 that the so-called fold-angle at the left-hand edge of the figure amounts to 180° but is 0° at the right-hand edge.

Heating device 33 consists of a block of light alloy designed as indicated hereinbefore and accommodating a heating resistor, not shown. The leads thereto run in supports 37 and by means of which the said heating device may be adjusted vertically.

Heating device 33 is followed by a second heating device 34 in the form of a hot-edge arranged below fold-line 36 and centreline "M" and running in parallel with the fold-line. This hot-edge has a heat-transfer-plate 38 clamped into a heater-element 39 which also contains a heating resistor, not shown. While the apparatus is in operation, linear upper edge 38a of heat-transfer-plate 38 is in contact with the underside of fold-line 36. While the apparatus is stationary, heating device 34 may be lowered by means of its supports 40 which are connected to hydraulic drives 41, in order to avoid overheating the foil. As a rule, the hot-edge has a higher surface-temperature than heating device 33 but the latter may also be arranged to be raised.

Heating devices 33 and 34 are shown shortened in the direction of travel of the foil. It is to be understood, however, that the length of the heating devices, in the direction of travel of the foil, corresponds at least to the total length of simultaneously deep-drawn container-parts 15,16. Since four parts of container-parts are produced simultaneously, the length of the heating devices must be at least equal to the distance between the axes of the first and fourth pair of mold-cavities, the so-called "repeat-length".

Located at the end of the heating station is guide-means 63 having two guide-walls 63a, 63b bent outwardly and forwardly in mirror-symmetry with the now vertical path of the foil, between which the upward-folding process is completed.

Upon completion of the upward-folding process, foil-parts 5a, 5b, lying flatly one upon the other except for the container parts, are passed to first sealing station 7 consisting of two sealing jaws 42,43 adapted to move at right angles to the axes of the containers.

Figure 6:
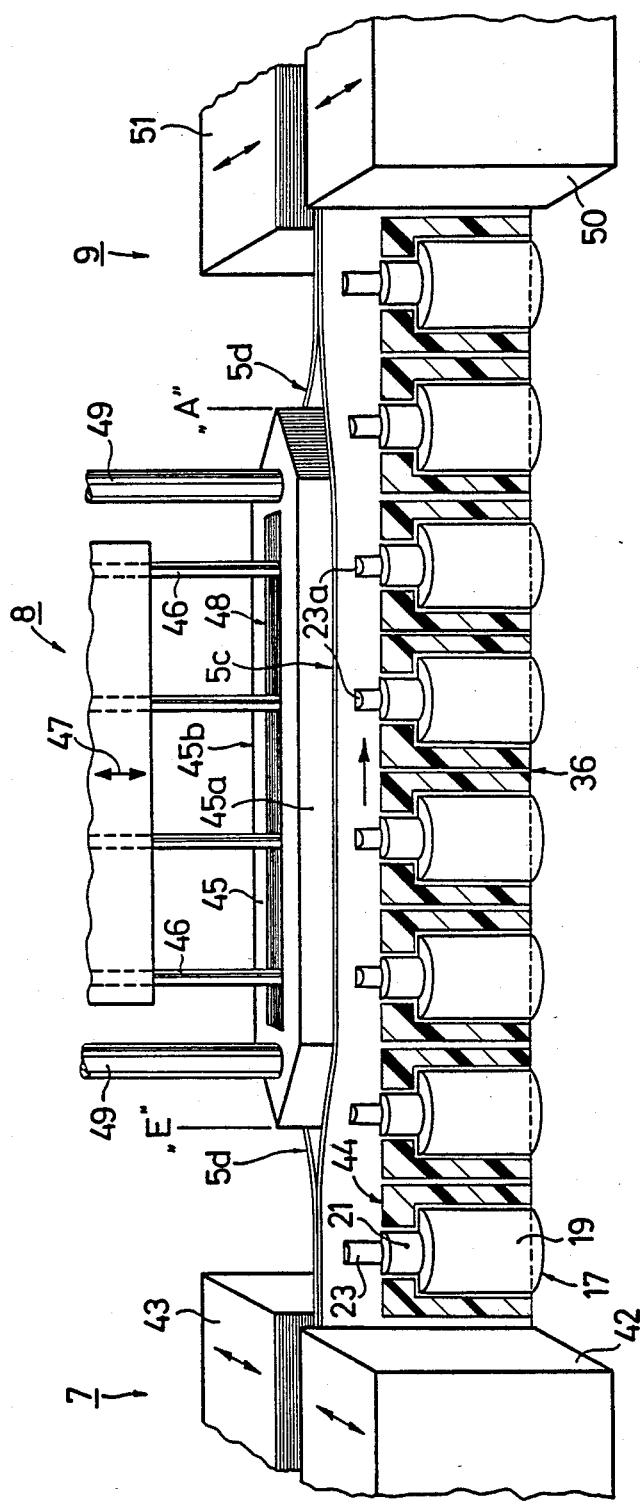
FIG. 6 is a perspective representation of the proceedings in the filling station between the first and second sealing stations.

The effects of first sealing station 7 appear in FIG. 6 to the right of the station. Foil-parts 5a, 5b are sealed together in the edge-areas of deep-drawn container-parts 15,16 lying in mirror-image one upon the other, from base 17,18 to the upper end of neck-section 21, 22, as indicated by the diagonally cross-hatched areas. The sealing does not, however, extend to the overlying area of tubular parts 23,24 nor to the upper edges of the foil; instead, this sealing zone ends at an upper boundary-line 44 located at the transition between relevant neck-section 21 and tubular 23. Hence the heated parts of sealing jaws 42,43 are shaped accordingly.

First sealing station 7 follows filling station 8 on inlet-side "E" of which is arranged the start of a spreading device 45 located in the path of the now existing foil-lamination on sides 45a and 45b of which upper edges 5c and 5d of foil 5 move past as upper tubular ends 23a are spread apart. The said spreading device is of wedge-shaped design at inlet-side "E" and outlet-side "A" and has substantially the shape of the hull of a ship, i.e. the ends are V-shaped. Filling station 8 comprises a total of four tubular filler-necks 46, the distance between them corresponding to the distance between the tubular parts in the foil-laminate. These filler-necks are connected by lines, not shown, and a metering device, to a storage-tank also not shown. By means of a timing control, care is taken to ensure that the filler-necks can be introduced into the tubular parts when the foil-laminate has come to a halt. During this time, four pairs of container-parts 15,16 are deep-drawn in station 4, are provided with suitable first sealing zones in the first sealing station, and are finally sealed in second sealing station 9 which will be dealt with further hereinafter.

In order to make it possible for filler-necks 46 to move in the direction of double arrow 47, a recess 48, running from top to bottom, is arranged in spreading device 45 along the longitudinal axis thereof running in the direction of travel of the foil-laminate, through which recess the said filler-necks are adapted to pass. Two supports 49 are used to adjust the height of spreading device 45. After the filling operation, foil-edges 5c, 5d close up again as a result of their inherent resiliency and move between sealing jaws 50,51 of second sealing station 9, which are mounted in such a manner as to move at right angles to the foil in the direction of the two double arrows, as in the case of jaws 42,43 of first sealing station 7.

Figure 7:
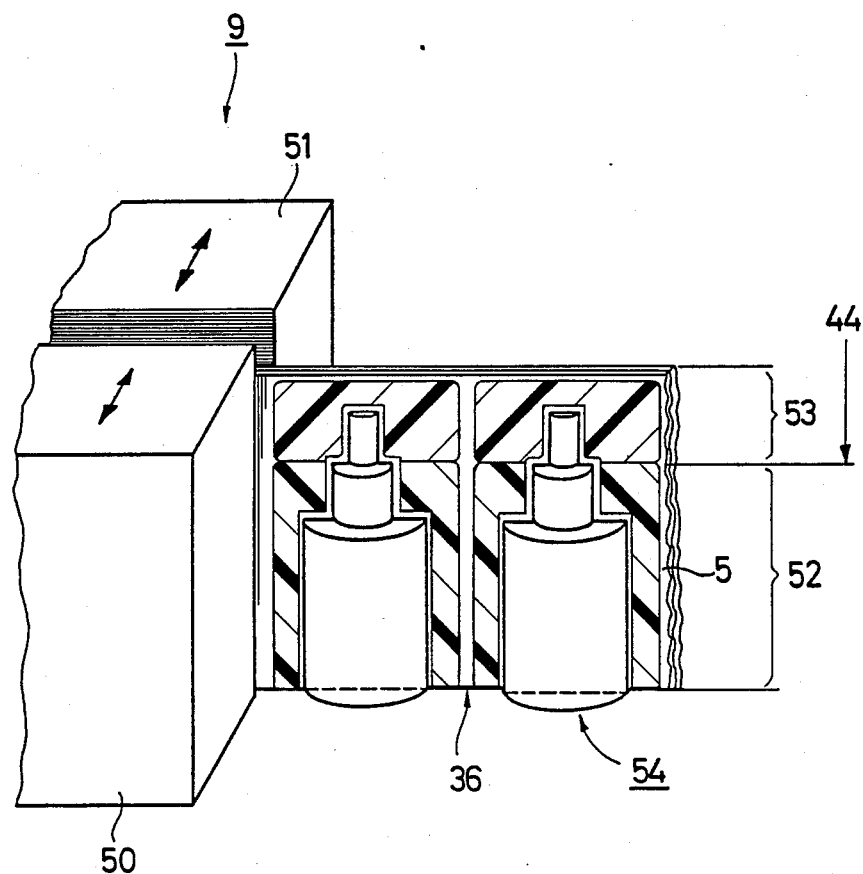
FIG. 7 is a perspective representation of the filled foil-laminate emerging from the second sealing station.

The action of sealing jaws 50,51 may be gathered from FIG. 7. Foil-parts 5a, 5b are sealed together in the hitherto un-connected edge areas of the foil-container, as far as previously described boundary lines 44 (FIG. 6), as indicated in FIG. 7 by cross-hatched areas with parallel edges. The foil-container is now sealed on all sides without the need for squeezing together tubular parts 23,24, as may easily be gathered from FIG. 7. From the shape of the cross-hatched areas with parallel edges in FIG. 7 comes the design of the heated zones of sealing jaws 50,51 which are shown in FIG. 7 as separate or slightly overlapping zones. It is highly desirable, however, to design the effective sealing surfaces of second sealing station 9 in such a manner that the sealing zones produced by them at the foil-laminate completely cover the sealing zones produced by the first sealing station so that it cannot be seen from the first container that the sealing was carried out in separate operations. This increases safety.

Also of special importance is the cooling of all sealing zones in cooling station 9a. To this end, the said station is equipped with cooling jaws whose cooling surfaces, acting on the foil, are of such a configuration as regards shape, size and position in relation to the foil-laminate, that the total area of all simultaneously cooled sealing zones is rapidly and effectively cooled. The sealing surfaces of the sealing tools, and the cooling surfaces of the cooling jaws, are thus substantially congruent—if they were to be projected one upon the other. For this reason, the heat introduced during the sealing process is rapidly removed again from the foil-laminate with the containers which have been filled in the meanwhile and the rigidity of the foil is restored. This is of particularly advantage during further handling of the group.

FIG. 8 shows a section of laminated foil consisting of foil-parts 5a, 5b, separated from adjacent foil-containers 54 by two broken lines 55. A twist-off is first produced in first stamping station 10 by producing, on each side of tubular part 23, weakening lines 58,59 which are directed towards the said tubular part, are in alignment with each other, but do not extend as far as the tubular part.

Thereafter, in second stamping station 11, foil-container 54 is separated from foil-laminate 5a, 5b by cutting into weakening lines 58,59 along a trace 56 which comprises two indentations in the vicinity of the said weakening lines. Broken line 60 below fold-line 36 indicates the course of flanged edges would take in the edge-areas of foil-container 54 if the latter were made of two separate pieces of foil and were filled through the base, for example. During the manufacturing process, foil-containers 54 may also be provided with labels 61.

FIG. 10 shows that several such foil-containers 54 may also remain joined together in the form of a packet. Additional weakening lines 62 are provided between connected edge-areas (the cross-hatched areas), along which individual holders may be separated, for example broken off, without the aid of tools. It will be seen that base-parts 17,18 lie in a common plane which also contains fold-line 36. However, it is not necessary for all containers to be of the same shape and size, or to have the same content. Instead it is quite possible to join containers of different sizes together and to fill them with difference substances, subsequently identifying them with labels.

As may be gathered more particularly from FIG. 9, foil-container 54 is mirror-symmetrical as regards its parting plane E—E. As regards parting plane E—E defined by its edge-areas, the foil-containers according to the invention may be either asymmetrical or symmetrical. An asymmetrical example of embodiment consists, for example, of a deep-drawn container-part and a flat container-part which serves merely as a closure. Also conceivable, of course, are intermediate forms in which the two container-parts are drawn to different depths or even have different geometrical shapes.

It is also possible to have the container-parts staggered in relation to each other in the parting plane, in order to produce a container of particularly striking appearance.

Finally, it is also conceivable to make one of the container-parts convex instead of concave, so that a space having a sickle-shaped cross-section is formed between the two parts, thus accommodating a particularly small amount of the product over a large surface. This is quite sufficient for packaging samples or publicity material.

In the interests of clarity, vertical guides for the foil or laminate, i.e. so-called support-plates, and horizontal guides, i.e. so-called lateral walls, are not shown, with the exception of guide-means 63. It is to be understood, however, that such guide-means are provided wherever the foil or laminate is in need of guidance or support, for example on both sides of filling station 8 and below spreading device 45.

What is claimed is:

1. A method for producing foil-containers in the form of bottles filled with freely flowing substances and having bases upon which they are adapted to stand, comprising:
   (a) deep-drawing at least a part of each foil-container, from a piece of flat deformable foil having a plane, having a base-part running substantially at right angles to the plane of the foil, with a neck-section remote from the base-part, and with edge-areas projecting outside the base at the periphery of the container-part;
   (b) folding the foil-material about a line located substantially at an edge-like transition between a plurality of base-parts and the plane of the foil;
   (c) connecting portions of foil lying on each side of the fold-line and one upon the other in edge-areas after having been folded around, from the base-parts to at least approximately upper ends of half-sections formed thereby, the foregoing steps being a first connecting process;
   (d) filling each container through the upper ends of the half-sections;
   (e) closing each container;
   (f) during the deep-drawing process, forming, on each neck-section, a tubular part directed away from the base-part and which is directed to the nearest foil-edge and has a tubular end at a distance "A" therefrom, and which subsequently ensures a sealed connection between foil-parts lying upon another end of the tubular part and initially not connected;
   (g) joining the foil-parts lying one upon the other together in an edge-area, with the exception of a filler opening, at tubular ends;
   (h) filling each foil-container through the tubular part;
   (i) sealing together the foil-parts lying one upon the other at a tubular end in the vicinity of the filler opening by a second connecting process and, finally,
   (j) separating filled and sealed foil-containers individually or into groups.

2. A method according to claim 1, which includes during the first connecting process, connecting the portions of the foil lying one upon the other only from each base-part to approximately an upper end of each neck-section, flat foil-parts above each neck-section being left not connected, spreading apart foil-parts in the vicinity of the tubular end and filling a foil-container through this spreading, releasing the spreading and finally sealing together the foil-parts, by the second connecting process, from above each tubular end to at least the upper ends connected by of the first connecting process.

3. A method according to claim 2, which includes
   (a) deep-drawing container-parts continuously in a deep-drawing station, in a moving piece of foil, on at least one side of a centerline "M" of the foil running in a direction of travel of the foil, the axes of the container-parts being directed horizontally during the deep-drawing and being at right angles to the centerline;
   (b) then heating the foil, along a path "L", in a heating station, at least in its middle area, to a material-specific temperature "$T_1$" which permits deformation below plasticizing, folding together the foil-parts lying on each side of the centerline "M" continuously in a vertical plane until the foil-parts come into contact with each other;
   (c) connecting together the foil-parts in edge-areas of at least one deep-drawn container part, in a first sealing station, from a base approximately to an upper end of a neck-section, but not at a top of tubular parts;
   (d) spreading a laminate emerging from the sealing station, above the connection produced in the sealing station, as far as edges of the foil inclusive of each tubular end, passing the laminate, in the spread condition, through a filling station and filling each container through each tubular end;
   (e) releasing the spreading and feeding the laminate from the filling station to a second sealing station and joining together the still-not-connected edge-areas together around the tubular ends;
   (f) providing weakened areas on each side of each tubular end, in connected edge-areas, to allow the tubular end to be twisted off, and finally
   (g) stamping out each filled and sealed foil-container individually or in groups.

4. A method according to claim 3, which includes passing the foil, in the heating station, under a heating element which heats the middle area of the foil from above.

5. A method according to claim 3, which includes passing the foil, in the heating station, over a hot-edge which comes into contact with the foil in the vicinity of a fold-line.

6. A method according to claim 1, which includes passing laminated foil, after emerging from the second sealing station through a cooling station and cooling the seal produced in the first sealing station by applying cooling jaws corresponding to sealing zones.

7. An apparatus for producing deep-drawn foil-containers having bases upon which they are adapted to stand, comprising: at least one deep-drawing tool having a flat tool-surface and having at least one mold-cavity per container, the mold-cavity comprising mold surfaces merging with each other in order to produce a base-part running at right angles to the tool-surface, a container-wall, a neck-section, and a tubular part extending therefrom, the axis of which runs in a surface of the tool determining an area of an edge of the foil-container.

8. An apparatus for the continuous production and filling of deep-drawn containers, and having a deep-drawing tool, according to claim 7, comprising:
   (a) a supply-station for a roll of foil;
   (b) a conveyor for carrying the foil drawn from the roll in a predetermined direction of travel;
   (c) a deep-drawing station lying in the path of the foil, for the continuous deep-drawing of container-parts from the foil passing over the tool-surface and lying thereupon, on at least one side of a centerline running in a direction of travel, the axes of tubular parts, extending from the neck-station, running at right angles to the direction of travel;
   (d) a heating station, extending over a section of a path of the foil in the direction of travel, with at least one heating device, located in a middle-area of the path of the foil, including guide-means for folding up foil-parts, located on each side of the centerline from their extended horizontal position, gradually about the the centerline until they come into contact with each other in a vertical plane;

(e) a first sealing station for connecting together the foil-parts to make a joint in edge-areas of at least one deep-drawn container-wall from the base-part to an upper end of the neck-section but not in an overlying area of the tubular part and not at upper edges of the foil;

(f) a filling station having at an inlet-side thereof a spreading device located in the path of the laminated foil, the filling station comprising at least one filler-neck which is adapted to be introduced from above, between spread edges of the foil, into tubular ends and which is adapted to be retracted again upon completion of the filling operation;

(g) a second sealing station for joining together parts of the foil in hitherto not connected edge-areas of a container, including edge-areas around tubular parts;

(h) a first stamping station for producing a twist-off by forming weakening lines on each side of the tubular parts;

(i) a second stamping station for separating at least one full container from joined foil by cutting into the weakening lines.

9. An apparatus according to claim 8, in which the section in the heating station is at least as long as a length of foil over the totality of simultaneously deep-drawn container-walls.

10. An apparatus according to claim 8, in which the heating station comprises a first heating device in the form of a heater-element arranged above a path of the foil, an undersurface of the heater-element, facing the foil, being defined by mirror-image surfaces arranged in a V-configuration in relation to each other and the angle of the V decreasing continuously from an inlet-side to an outlet-side in accordance with a decrease in fold-angle between the container-parts, and a crest-line of surfaces extending directly over a fold-line of the container-parts in such a manner that the underside of the heater-element is, at all points, at the shortest possible distance from the foil.

11. An apparatus according to claim 8, in which the heating station comprises a second heater device which is in the form of a hot-edge arranged under the fold-line and the centerline and running parallel with the fold-line.

12. An apparatus according to claim 11, in which the hot-edge is mounted in such a manner that it can be lowered.

13. An apparatus according to claim 8, in which the first sealing station comprises heatable jaws with sealing surfaces which are defined in areas above a base, on both sides of the container-wall and at least a part of the neck-section of the foil-container.

14. An apparatus according to claim 8, in which the spreading device is wedge-shaped towards both an inlet-side and an outlet-side.

15. An apparatus according to claim 14, the spreading device is in the form of the hull of a ship.

16. An apparatus according to claim 15, in which the spreading device comprises, in a longitudinal axis extending in a direction of travel of the foil, a recess passing from top to bottom through which at least one filler-neck from the filling station can pass.

17. An apparatus according to claim 8, in which the second sealing station comprises heatable jaws with sealing surfaces covering at least an area on each side and above the tubular parts.

18. An apparatus according to claim 17, in which the sealing surfaces in the second sealing station are sized in such a manner that they cover also the whole of sealing zones of the first sealing station.

19. An apparatus according to claim 8, which includes, adjoining the second sealing station, a cooling station with cooling jaws having cooling surfaces which, as regards their position relative to a foil-joint and their configuration and size, correspond substantially to the position, configuration and size of sealing zones in the second sealing station.

* * * * *